D. SULLIVAN.

STEAM-BOILER.

No. 7,196. Reissued June 27, 1876.

Witness
John R. Mason
N. E. Brown

Inventor
Daniel Sullivan
per Wm. Franklin Jenney.

N. PETERS, PHOTO-LITHOGRAPHER, WASHINGTON, D. C.

UNITED STATES PATENT OFFICE.

DANIEL SULLIVAN, OF BANGOR, MAINE.

IMPROVEMENT IN STEAM-BOILERS.

Specification forming part of Letters Patent No. 149,616, dated April 14, 1874; reissue No. 7,196, dated June 27, 1876; application filed June 12, 1876.

*To all whom it may concern:*

Be it known that I, DANIEL SULLIVAN, of Bangor, in the county of Penobscot and State of Maine, have invented certain new and useful Improvements in Steam-Boilers; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 2:
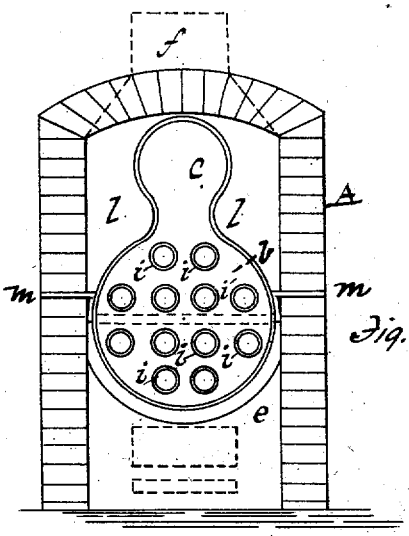
Figure 1:
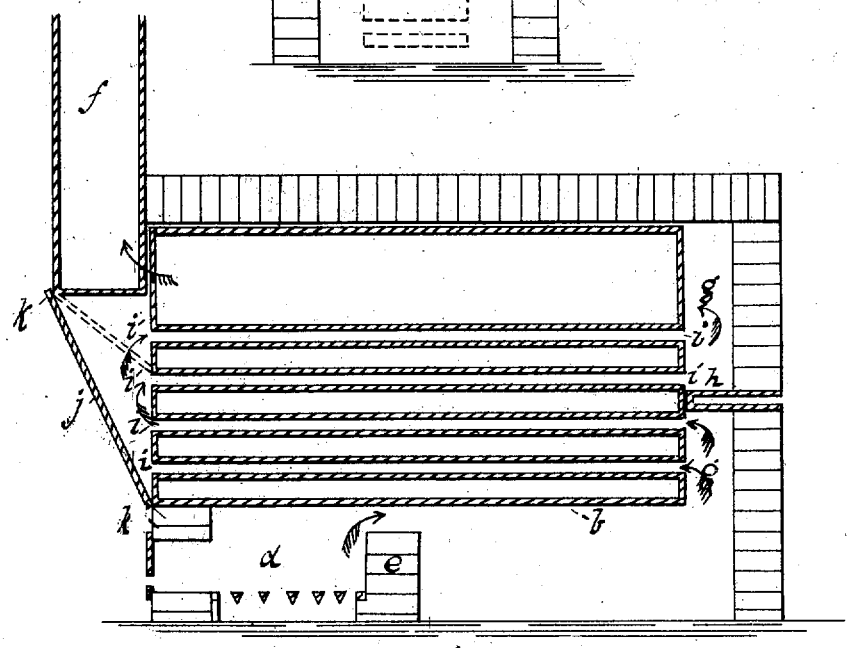

Figure 1 shows a longitudinal section, and Fig. 2 a transverse section, of my boiler.

Same letters show like parts.

My invention relates to that class of tubular boilers in which the products of combustion, after serving the purpose of producing the steam, are used to superheat it. It is designed both to increase the heating-surface and to condense it within a small space, so that the water may be acted upon by the intense heat, and also to more effectually utilize the products of combustion in superheating the steam, which latter purpose I effect by conducting the smoke and flame, after they have served their purpose of generating the steam, through passages upon either side of the steam-dome, to the chimney or smoke-stack. These passages are formed by the sides of the steam-dome and boiler-casing, and communicate with the fire-box and smoke-stack.

The construction of my boiler and the devices for increasing the heating-surface will be understood by reference to the drawings.

A shows the boiler-casing, which may be either iron or brick-work. Within it is the boiler *b*, somewhat shorter than the casing, and having the steam dome or cylinder *c* thereon. At *d* is the fire-box. *e* shows the bridge, and *f* the smoke-stack. As the smoke and flame leave the fire-box they pass over the bridge, and around the end of the boiler, into the space *g*, between it and the casing. About half-way up this space is a stop, *h*, extending across it, so as to prevent the further rise of the smoke. By this it is forced to escape by passing through the lower set of tubes *i*. At the front of the boiler is a supplemental head, *j*, secured to a rim, *k*, which projects farther from the boiler at the top than at the bottom. This serves as a conductor for the tubes, leading the smoke from the lower set *i*, below the stop *h*, to the upper set *i'* above it. Passing through these upper tubes, it again reaches the space *g* at the rear of the boiler, this time above the stop *h*. From thence it is conducted to the smoke stack or flue through passages *l* at the sides of the steam-cylinder *c*, formed by it and the casing A, during its passage serving to superheat the steam collected in said cylinder.

It will be seen that, the products of combustion being caused to return twice in their passage to the flue, a large part of the heat can be utilized for making the steam, and the size of the boiler diminished, while its heating-surface remains the same.

My construction and arrangement of the steam-cylinder and the smoke-passages also enables the superheating to be done very effectually and with little waste.

The stop *h* may, if desired, be made double, as shown, instead of a single plate, and, by admitting air between the plates from the outside of the casing, it will be less liable to burn out. Flanges *m m* may also be secured to the sides of the boiler, to serve as a support for it, they resting on or being built into the brick-work of the casing.

What I claim as my invention, and desire to secure by Letters Patent, is—

1. In combination with the casing A and boiler *b*, having the space *g* between them at one end, the tubes *i* and *i'*, stop *h*, supplemental head *j*, and passages *l*, substantially as set forth and shown.

2. In combination with the casing A and boiler *b*, the steam-dome *c* and passages *l* on each side thereof, said passages communicating at one end with the fire-box and at the other with the flue, substantially as set forth and shown.

In testimony that I claim the foregoing I have hereunto set my hand this 24th day of September, 1875.

DANIEL SULLIVAN.

Witnesses:
WM. FRANKLIN SEAVEY,
JOHN R. MASON.